April 11, 1939.     H. E. YOUNG     2,154,020

CONSTANT VOLTAGE SYSTEM

Filed April 9, 1936

Inventor:
Hugh E. Young
By Mawrfassion Bortleker Dreurs
Attys.

Patented Apr. 11, 1939

2,154,020

UNITED STATES PATENT OFFICE 2,154,020

CONSTANT VOLTAGE SYSTEM

Hugh E. Young, Chicago, Ill.

Application April 9, 1936, Serial No. 73,413

4 Claims. (Cl. 171—119)

My invention relates generally to electrical control systems and it has particular relation to such systems of the constant voltage type.

It is desirable, in many instances, to provide for maintaining the voltage across an alternating current load at a substantially constant value. In the past, constant voltage regulators of the induction type have been provided which depend for their operation on the relative movement of one winding with respect to another winding. A voltage relay, energized from the alternating current circuit, is used to control the operation of a motor which in turn operates the movable winding to different positions, depending upon the magnitude of the departure of the line voltage from a predetermined value. Because of the relatively moving parts in such a regulator, the insulation problem is exceedingly difficult. Moreover, since a motor is employed to operate the movable winding, the operation is relatively sluggish.

The object of my invention, generally stated, is to provide a constant voltage regulating system which shall be simple, efficient and accurate in operation and which may be readily and economically manufactured and installed.

The principal object of my invention is to provide for varying the effective impedance of a regulating transformer in a power circuit in such manner as to maintain a substantially constant voltage across the circuit.

An important object of my invention is to provide for varying the effective impedance of a regulating transformer by changing the saturation of a reactor connected to control a winding of the transformer.

Another important object of my invention is to provide for changing the saturation of a reactor in accordance with changes in voltage across an alternating current circuit to control the effective impedance of a regulating transformer connected in the circuit.

A further object of my invention is to provide for varying the conductivity of electric valve rectifying devices in accordance with changes in voltage across an alternating current circuit to control the amount of direct current in the saturating winding of a reactor connected to control the effective impedance of a regulating transformer in an alternating current circuit to maintain the voltage across the circuit at a substantially constant value.

Other objects of my invention will in part be obvious and in part appear hereinafter.

My invention, accordingly, is disclosed in the embodiments hereof shown in the accompanying drawing and comprises the features of construction, combination of elements, and arrangement of parts which will be exemplified in the constructions hereinafter set forth, and the scope of the application of which will be indicated in the appended claims.

For a more complete understanding of the nature and scope of my invention, reference may be had to the following detailed description, taken in connection with the accompanying drawing, in which.

According to my invention, I provide a regulating transformer having a secondary winding connected in series circuit relation with the circuit interconnecting an alternating current source and the load device. The regulating transformer is provided with a primary winding which is arranged to be connected in shunt circuit relation across the load circuit. The primary winding may be connected either to add to or to subtract from the voltage which is present across the secondary winding which is connected in series circuit relation. For this purpose a reversing switch may be provided.

In order to control the effective voltage applied to the primary winding of the regulating transformer, a saturable reactor is provided having an operating winding which is arranged to be connected in series circuit relation with the primary winding of the regulating transformer. The saturable reactor is provided with a control winding through which direct current is caused to flow from a rectifier circuit which includes a pair of uni-directional conducting electric valves. By controlling the time in each half cycle at which the electric valves are rendered conducting, it is possible to control the flow of current through the control winding of the saturable reactor. This may be accomplished by means of an automatic regulator which operates in accordance with changes in voltage across the load circuit.

The effective impedance of the operating winding of the saturable reactor depends upon the amount of direct current flowing through the control winding. As the flow of direct current is increased, the effective impedance of the operating winding is decreased, as will be readily understood by those skilled in the art. There will, then, be a corresponding increase in the voltage which is applied across the primary winding of the regulating transformer and as a result the effective impedance thereof will either be increased or decreased, depending upon the relative connection of the terminals of the primary winding to the load circuit.

In a modification of my invention, the regulating transformer has incorporated therein the control winding of the saturable reactor. The saturation of the core of the regulating transformer, therefore, is directly controlled, and, as a result, the effective impedance of the regulating transformer is varied. The same type of automatic regulator, as previously mentioned, may be employed for controlling the flow of direct current through the control winding.

The effect of the regulating transformer is described herein in terms of change in effective impedance, rather than in terms of change in voltage which may be generated therein. It is thought that a description based on such an effect will more clearly set forth the novel features of this invention. However, it will be understood that the effect of the regulating transformer may be considered from a voltage standpoint, as well as from an impedance standpoint.

Figure 1:
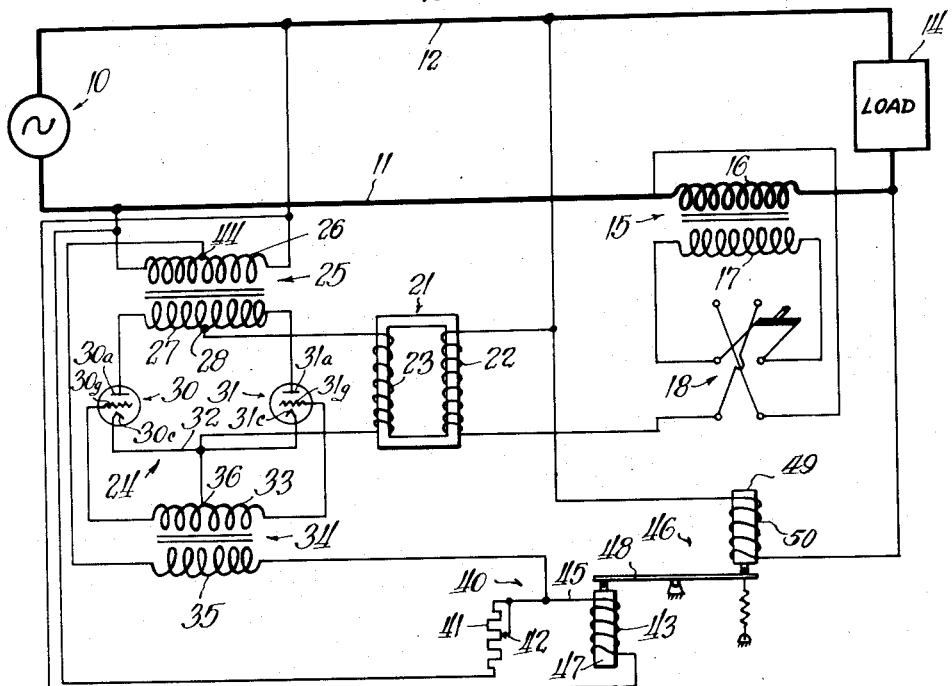
Figure 1 illustrates diagrammatically one embodiment of my invention.

Referring now particularly to Figure 1 of the drawing, the reference character 10 designates, generally, a source of alternating current, such as a 60 cycle source, which is arranged to energize a load circuit comprising conductors 11 and 12 across which a load, represented by the reference character 14, may be connected. For the purpose of maintaining a substantially constant voltage across the load, a regulating transformer, shown generally at 15, is provided, having a secondary winding 16 which may be connected in series circuit relation with the load circuit conductor 11, and a primary winding 17 which may be connected to a reversing switch, shown generally at 18. With a view to controlling the effective impedance of the regulating transformer 15, a saturable reactor, shown generally at 21, is provided, having an operating winding 22 and a control winding 23. As shown, the operating winding 22 is arranged to be connected, by means of the reversing switch 18, in series circuit relation with the primary winding 17 of the regulating transformer 15, and the two windings are arranged to be connected across the load circuit comprising the conductors 11 and 12. By controlling the amount of direct current flowing through the control winding 23, it is possible to control the effective impedance of the operating winding 22 and, consequently, the voltage which is applied across the primary winding 17. It will be understood that the primary winding 17 induces a voltage in the secondary winding 16, which either adds to or subtracts from the voltage therein, depending upon the position of the reversing switch 18. The amount of voltage induced, of course, depends upon the degree of saturation of the saturable reactor 21.

In order to provide a supply of direct current for the control winding 23, a rectifier circuit, shown generally at 24, is provided. As illustrated, the rectifier circuit 24 is arranged to be energized by means of a transformer, shown generally at 25, having a primary winding 26 connected for energization across the alternating current source 10. The transformer 25 is provided with a secondary winding 27 having a mid-tap 28. The terminals of the secondary winding 27 are connected to the anodes 30a and 31a of electric valves, shown generally at 30 and 31, respectively. The valves 30 and 31 are of the hot cathode, arc discharge type, and are provided, respectively, with cathodes 30c and 31c and with control electrodes 30g and 31g. As shown, the cathodes 30c and 31c are interconnected by means of a common connection 32. The control electrodes 30g and 31g are connected to the terminals of the secondary winding 33 of the grid transformer, shown generally at 34, having a primary winding 35. The secondary winding 33 is provided with a mid-tap 36 which may be connected to the common connection 32 in order to provide for maintaining the proper potential of the control electrodes 30g and 31g relative to their respective cathodes 30c and 31c.

It is desirable to control the time in each half-cycle at which the electric valves 30 and 31 are rendered conducting by the energization of the control electrodes 30g and 31g, in order to control the flow of direct current through the control winding 23 which is connected, as shown, between the mid-tap 28 on the secondary winding 27 and the common connection 32 between the cathodes 30c and 31c. For this purpose a phase shifting circuit, shown generally at 40, is provided, comprising a potentiometer 41, provided with a movable connection 42, and an inductor 43. It will be noted that the potentiometer 41 and the inductor 43 are connected for energization across the source of alternating current 10, and that the primary winding 35 of the grid transformer 34 is connected between a mid-tap 44 of the primary winding 26 and a common connection 45 between the potentiometer 41 and the inductor 43. By shifting the phase relationship of the voltage applied to the primary winding 35 relative to the voltage of the alternating current source 10, it is possible to advance or retard the time in each half-cycle at which the valves 30 and 31 are rendered conducting. This function may be accomplished automatically by means of a regulator, shown generally at 46. The regulator 46 may be of the type which is shown in my co-pending application, Serial No. 618,369, filed June 20, 1932. As shown, the regulator 46 is provided with an armature 47 which may be secured to a lever 48 at the other end of which is a second armature 49. The movement of the armature 47 in and out of the reactor 43 will vary the reactance thereof, as will be well understood by those skilled in the art. The position of the armature 47 is controlled by means of a winding 50 surrounding the armature 49, as illustrated, and which may be connected for energization across the load circuit comprising the conductors 11 and 12.

In operation, the switch 18 is closed in one position or the other, depending upon whether it is desired to maintain a higher or a lower voltage across the load 14 than is supplied by the alternating current source 10. The movable connection 42 is positioned along the potentiometer 41 at a point corresponding to the voltage it is desired to maintain across the load 14. The system may then be energized by the closing of suitable switches which are not shown. If the voltage applied to the load circuit is above a predetermined value for which the system is set or adjusted, the armature 49 will be attracted to move the lever 48 and cause a corresponding downward movement of the armature 47 to increase, for example, the reactance of the reactor 43. The phase relationship of the voltage applied to the primary winding 35 of the grid transformer 34 will then be altered in such manner relative to the voltage of the alternating current source 10 that the time when the valves 30 and 31 are rendered conducting will be either increased or retarded in each half-cycle, depending upon the connection of the grid transformer 34. There will, accordingly, be either an increase or a decrease in the flow of direct current through the control winding 23 of the saturable reactor 21.

Assuming that the switch 18 is closed to such a position that the voltage induced in the secondary winding 16 by the primary winding 17 will add to the load circuit voltage, then the system will be so connected that there will be a decrease in the flow of direct current through the control winding 23 with a consequent increase in the effective impedance of the operating winding 22, and a corresponding decrease in the voltage which is applied across the secondary winding 17. As a result, the voltage across the load 14 will be decreased. It will be observed that this mode of operation has the effect of increasing the effective impedance of the regulating transformer 15 in the load circuit, and that, on its being increased, the voltage which was previously assumed to have been too high across the load 14, will be correspondingly reduced. It will be understood that the regulator 46, functioning in this manner, will tend to maintain the voltage across the load 14 at a substantially constant predetermined value.

Figure 2:
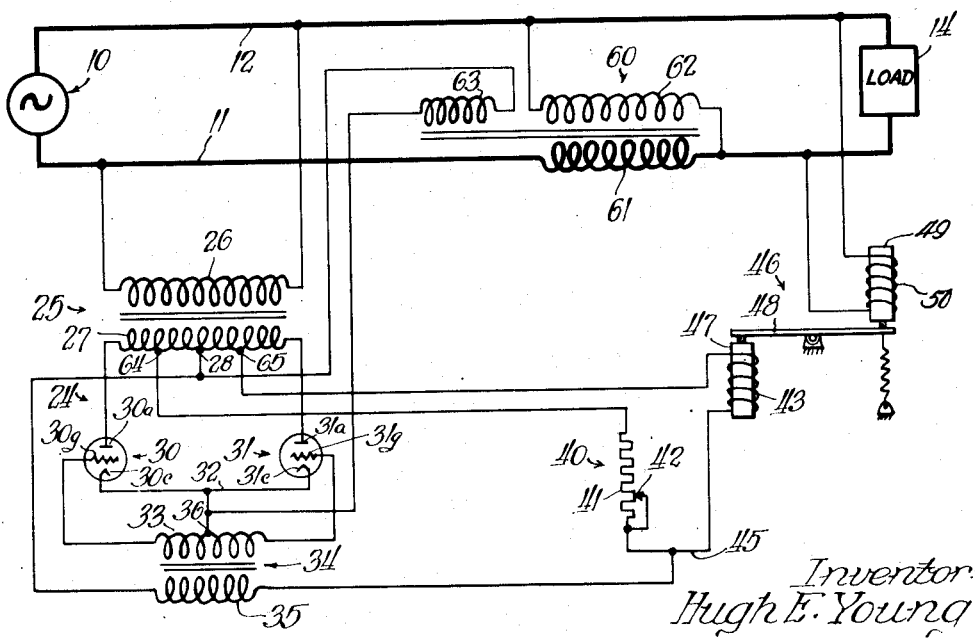
Figure 2 illustrates diagrammatically another embodiment of my invention.

Referring now particularly to Figure 2 of the drawing, it will be observed that another embodiment of the circuit connections illustrating my invention is there shown. As illustrated, the saturable reactor 21 and the regulating transformer 15 of Figure 1 are incorporated in one device, which is shown generally at 60. The regulating transformer 60 is provided with a secondary winding 61 similar to the secondary winding 16 of the transformer 15, and it is connected in series circuit relation with the load conductor 11. In addition, the regulating transformer 60 is provided with a primary winding 62 which may be connected directly across the load circuit. A control winding 63, corresponding to the control winding 23 of the saturable reactor 21, is provided, and when energized with direct current is arranged to control the saturation of the core of the transformer 60 on which the secondary and primary windings 61 and 62 are positioned.

In this modification of my invention, it will be observed that the control winding 63 is connected between the mid-tap 28 on the secondary winding of the transformer 25 and the common connection 32 between the cathodes 30c and 31c of the valves 30 and 31, respectively. It will also be noted that the phase-shifting circuit 40 is connected across taps 64 and 65 located on the secondary winding 27, and that one terminal of the primary winding 35 of the grid transformer 34 is connected to the mid-tap 28 rather than to a mid-tap on the primary winding 26. The remaining circuit connections are identical with those shown in Figure 1 of the drawing.

In operation, the amount of direct current flowing through the control winding 63 is controlled by means of the automatic regulator 46 in a manner similar to that in which the current flow is controlled in the control winding 23 of the saturable reactor 21, as set forth in detail hereinbefore. It will then be understood that the effective impedance of the regulating transformer 60 will be controlled by changing the amount of direct current flowing through the control winding at 63. For example, if the voltage across the load 14 is too low, the phase shift circuit 40 will be adjusted by means of the regulator 46 so that the time in each half-cycle at which the valves 30 and 31 are rendered conducting will be advanced, and consequently more direct current will flow through the control winding 63. As a result, the effective impedance of the transformer 60 will be decreased and there will be a corresponding increase in the voltage which is applied to the load 14.

Since further changes may be made in the foregoing constructions, and different embodiments of the invention may be made without departing from the scope thereof, it is intended that all matters set forth in the above description, or shown in the accompanying drawing, shall be interpreted as illustrative, and not in a limiting sense.

I claim as my invention:

1. An electric system comprising, in combination, circuit means for connecting a load device to a source of alternating current, a transformer having a secondary winding connected in series circuit relation with said circuit means and a primary winding, a saturable reactor having an operating winding and a direct current control winding, said primary and operating windings being connected in series circuit relation and across said load circuit, and means operable in accordance with changes in the voltage across said circuit means for varying the energization of said control winding, whereby the effective voltage of said transformer is varied to maintain a predetermined voltage across said load device.

2. An electric system comprising, in combination, circuit means for connecting a load device to a source of alternating current, a transformer having a secondary winding connected in series circuit relation with said circuit means and a primary winding, a saturable reactor having an operating winding and a direct current control winding, said primary and operating windings being connected in series circuit relation and across said load circuit, electric valve means connected to control the energization of said control winding, and means for controlling the conductivity of said valve means in accordance with changes in the voltage across said circuit means to correspondingly change the effective voltage of said transformer and maintain said voltage at a predetermined value.

3. An electric system comprising, in combination, circuit means for connecting a load device to a source of alternating current, a transformer having a secondary winding connected in series circuit relation with said circuit means and a primary winding, a saturable reactor having an operating winding and a direct current control winding, said primary and operating windings being connected in series circuit relation and across said load circuit, electric valve means connected to control the energization of said control winding, control electrode means in said valve means, regulatable phase shift means disposed to be energized from said source of alternating current and connected to control the energization of said control electrode means, and regulating means connected to be responsive to changes in voltage across said circuit means for controlling the functioning of said phase shift means whereby the conductivity of said valve means is varied to change the effective voltage of said transformer for maintaining the voltage across said circuit means at a substantially constant value 4. An electric system comprising, in combination, circuit means for connecting a load device to a source of alternating current, a transformer having a secondary winding connected in series circuit relation with said circuit means and a secondary winding, a saturable reactor having an operating winding and a direct current control winding, said primary and operating windings being connected in series circuit relation and across said load circuit, full wave rectifying means comprising a pair of electric valves disposed to be connected to said alternating current source in such manner as to supply direct current for energizing said control winding, a control electrode in each of said valves, a regulatable phase shifting circuit disposed to be energized from said source of alternating current and coupled to said control electrodes, and a regulator connected to be responsive to changes in voltage across said circuit means for controlling the functioning of said phase shifting circuit to change the time in each half cycle of the alternating current at which said control electrodes are energized, whereby the conductivity of said valves is controlled to vary the effective voltage of said transformer for maintaining the voltage across said circuit means at a substantially constant value.

HUGH E. YOUNG.